United States Patent
Ryu et al.

(10) Patent No.: US 7,910,174 B2
(45) Date of Patent: Mar. 22, 2011

(54) APPARATUS AND METHOD OF FABRICATING FLAT PANEL DISPLAY DEVICE

(75) Inventors: Jae Choon Ryu, Gumi-si (KR); Hae Joon Son, Busan (KR)

(73) Assignee: LG Display Co., Ltd., Seoul (KR)

( * ) Notice: Subject to any disclaimer, the term of this patent is extended or adjusted under 35 U.S.C. 154(b) by 70 days.

(21) Appl. No.: 12/349,208

(22) Filed: Jan. 6, 2009

(65) Prior Publication Data

US 2009/0117810 A1    May 7, 2009

Related U.S. Application Data

(62) Division of application No. 11/005,705, filed on Dec. 7, 2004, now Pat. No. 7,488,388.

(30) Foreign Application Priority Data

Dec. 11, 2003  (KR) .............................. P2003-90293

(51) Int. Cl.
*B05C 11/10* (2006.01)
(52) U.S. Cl. ...................... 427/427.2; 156/64
(58) Field of Classification Search ............... 427/427.2; 156/64, 356, 357, 378, 379; 118/664, 668, 118/669, 670, 679, 680, 681, 712, 713
See application file for complete search history.

(56) References Cited

U.S. PATENT DOCUMENTS

| 5,437,727 A | 8/1995 | Yoneda et al. |
| 2002/0176928 A1 | 11/2002 | Minami et al. |

FOREIGN PATENT DOCUMENTS

| JP | 5-323332 | 12/1993 |
| JP | H08-304796 | 11/1996 |

OTHER PUBLICATIONS

Notification of Office Rejection for corresponding Chinese Patent Application Serial No. 2004100866886, dated Aug. 3, 2007.
Office Action dated Oct. 13, 2006 for corresponding Chinese Patent Application No. 2004100866886.
Patent Abstract for JP05-323332, Dec. 7, 1993, Japan (document submitted with Nov. 8, 2006 IDS).
Patent Abstract for JP08-304796, Nov. 12, 1996, Japan.

*Primary Examiner* — George R Koch, III
(74) *Attorney, Agent, or Firm* — Brinks Hofer Gilson & Lione

(57) ABSTRACT

An apparatus for fabricating a flat panel display device includes a substrate on which a picture display section is formed and a stage on which the substrate is loaded. A dispenser applies a sealant along an outer line of the picture display section in the substrate. A light detector emits light toward the sealant and detects the amount of reflected light in real-time. A controller detects broken lines in the sealant in accordance with a signal supplied from the light detector and controls the dispenser so as to re-apply the sealant to spaces in the broken line in which the sealant is not present.

4 Claims, 8 Drawing Sheets

APPARATUS AND METHOD OF FABRICATING FLAT PANEL DISPLAY DEVICE

RELATED APPLICATIONS

The present patent document is a divisional patent application of U.S. application Ser. No. 11/005,705, filed Dec. 7, 2004, now U.S. Pat. No. 7,488,388, which claims the benefit of Korean Patent Application No. P2003-90293 filed in Korea on Dec. 11, 2003, which is hereby incorporated by reference.

BACKGROUND

The present application relates to an apparatus and a method of fabricating a flat panel display device, to an apparatus and a method of fabricating a flat panel display device capable of detecting a broken line of a sealant in real time and of automatically repairing the detected broken line of the sealant.

DESCRIPTION OF THE RELATED ART

Recently, various types of flat panel display (FPD) devices have been developed that are smaller and lighter than cathode ray tube display devices. Such devices include a liquid crystal display (LCD) device, a field emission display (FED) device, a plasma display panel (PDP) and an electro-luminescence (EL) display device.

The FPD includes a flat panel in which cells are arranged in a matrix between two glasses, a printed circuit board module for driving the flat panel, and a case for protecting the flat panel and the printed circuit board module and integrating them. Since the LCD device is not a self-luminous device, the LCD device requires a separate light source such as a back light unit. Herein, the printed circuit board module receives red, green and blue image data, and a synchronizing signal from an exterior and then processes them to supply an image data, a scanning signal and a timing control signal to the flat panel. Such a printed circuit board module corresponds to a driving circuit making to normally display a computer image, a television image and the other available image on the flat panel.

A description of a LCD device will serves as an example of a FPD. The LCD device controls light transmittance of liquid crystal cells in accordance with video signals, thereby displaying pictures corresponding to the video signals on a liquid crystal display panel where liquid crystal cells are arranged in a matrix. To this end, the LCD device includes an active region where the liquid crystal cells are arranged in an active matrix, and a driving circuit for driving the liquid crystal cells of the active region.

Figure 1:
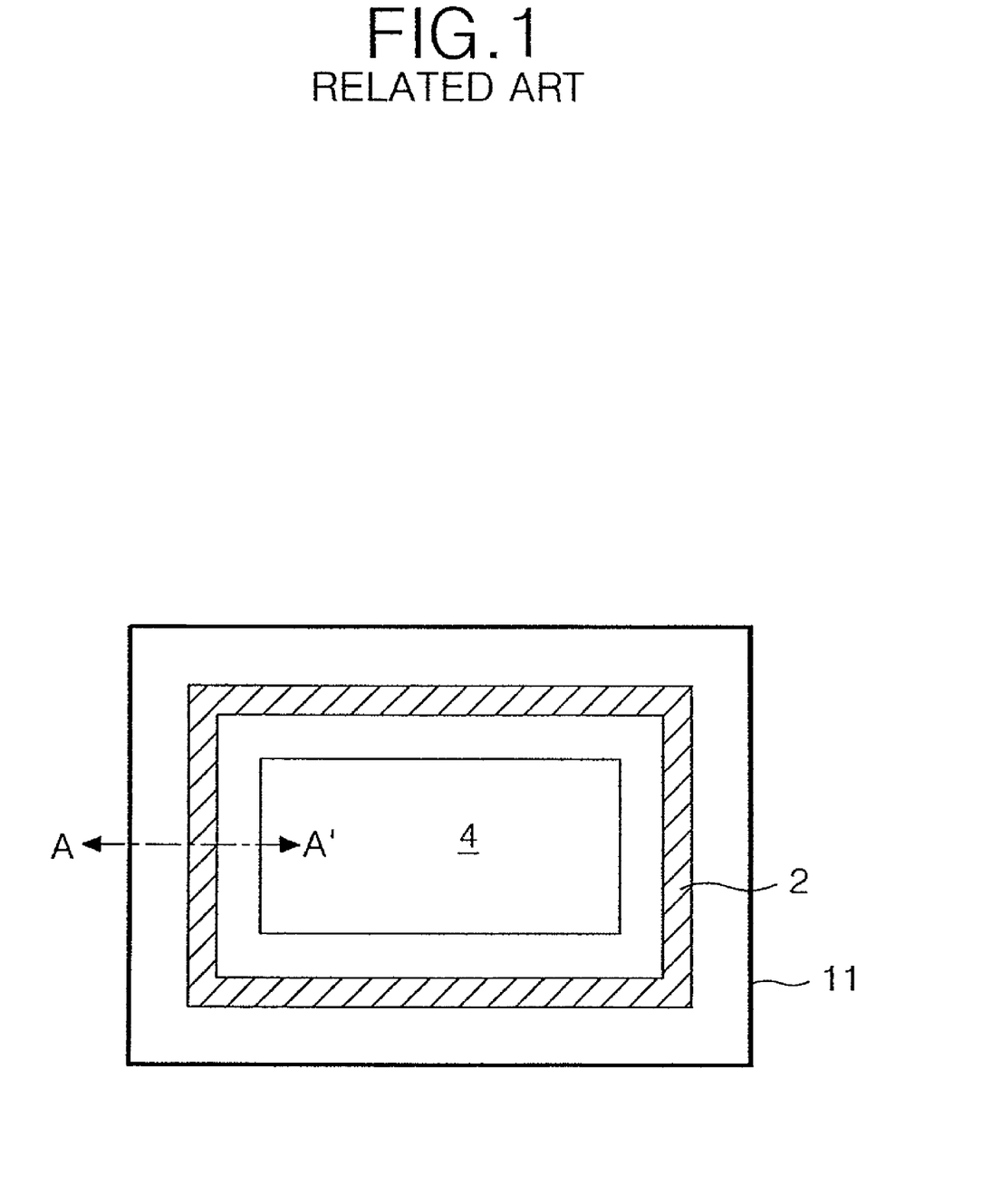
FIG. 1 is a plan view illustrating a related art liquid crystal display device.
Figure 2:
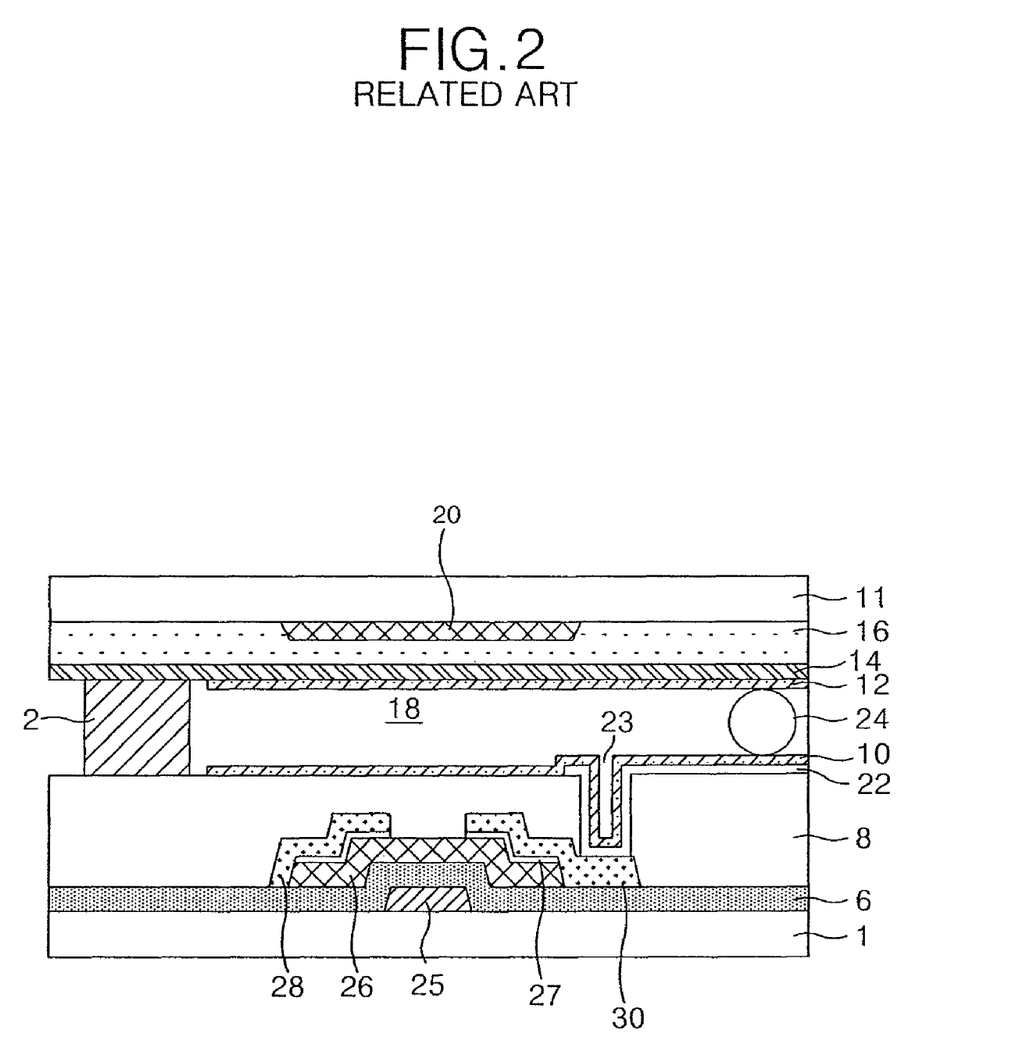
FIG. 2 is a sectional view illustrating the liquid crystal display device taken along line A-A' in FIG. 1.

Referring to FIGS. 1 and 2, a related art LCD device has a structure, in which an upper plate and a lower plate are faced to combine each other. The related art LCD device includes a picture display section 4 where liquid crystal cells are located, and a sealant 2 for combining the upper plate and the lower plate.

The picture display section 4 includes: the upper plate having a black matrix 20, a color filter 16 and a common electrode 14; and a lower plate facing to and combined with the upper plate and having a thin film transistor and a pixel electrode 22. Spacers 24 are formed between the upper plate and the lower plate. Also, a liquid crystal material 18 is injected into an inner space provided by the spacers 24 between the upper plate and the lower plate.

On the upper plate, the black matrix 20 is formed in a matrix on an upper substrate 11. The black matrix 20 serves to partition a surface of the upper substrate 11 into a plurality of cell regions at which the color filters 16 will be formed, and to prevent the interference of light between adjacent cells. Color filters 16 of the primary three colors, i.e., red, green and blue are sequentially formed on the upper substrate 11 where the black matrix 20 is formed. In this case, a material absorbing white light and transmitting only particular light with a specific wavelength, i.e., red, green or blue, is applied on an entire surface of the upper substrate 11 having the black matrix 20. Thereafter, the material is patterned, to thereby form each of the three color filters 16 of the primary three colors. A common electrode 14, a transparent conductive material having a ground electric potential supplied thereto, is formed on the upper substrate 11 where the black matrix 20 and the color filters 16 are formed. A polyamide is applied so as to cover the common electrode 14, to thereby form an upper alignment film 12.

The sealant 2 is formed at an outer line of the picture display section 4 in the upper plate to combine the upper plate and the lower plate.

In the lower plate, the TFT that switches the driving of the liquid crystal cell includes a gate electrode 25 extended from a gate line (not shown), a source electrode 28 extended from a data line (not shown), and a drain electrode 30 connected to a pixel electrode 22 through a contact hole 23. Further, the TFT includes a gate insulating film 6 to separately insulate the gate electrode 25, the source electrode 28 and the drain electrode 30; semiconductor layers 26 and 27 to form a conductive channel between the source electrode 28 and the drain electrode 30 by a gate voltage supplied to the gate electrode 25. Such a TFT selectively supplies a data signal from the data line to the pixel electrode 22 in response to a gate signal from the gate line.

The pixel electrode 22 is located at a cell area defined by the crossing of the data line and the gate line and is formed of a transparent conductive material with high light transmittance. The pixel electrode 22 is formed on a passivation film 8 applied to the entire surface of a lower substrate 1, and electrically connected to the drain electrode through the contact hole 23 formed in the passivation film 8.

After applying a lower alignment film 10 to an upper portion of the lower substrate 1 where the pixel electrode 22 is formed, a rubbing process is performed. Thereafter, the spacers 4 for maintaining a gap between the upper plate and the lower plate are sprayed to complete the lower plate.

Lastly, the upper plate and the lower plate separately made as described above are put into a desired position to combine them together by use of the sealant 2. Thereafter, the liquid crystal material is injected and is sealed, to thereby complete the LCD device.

Figure 3:
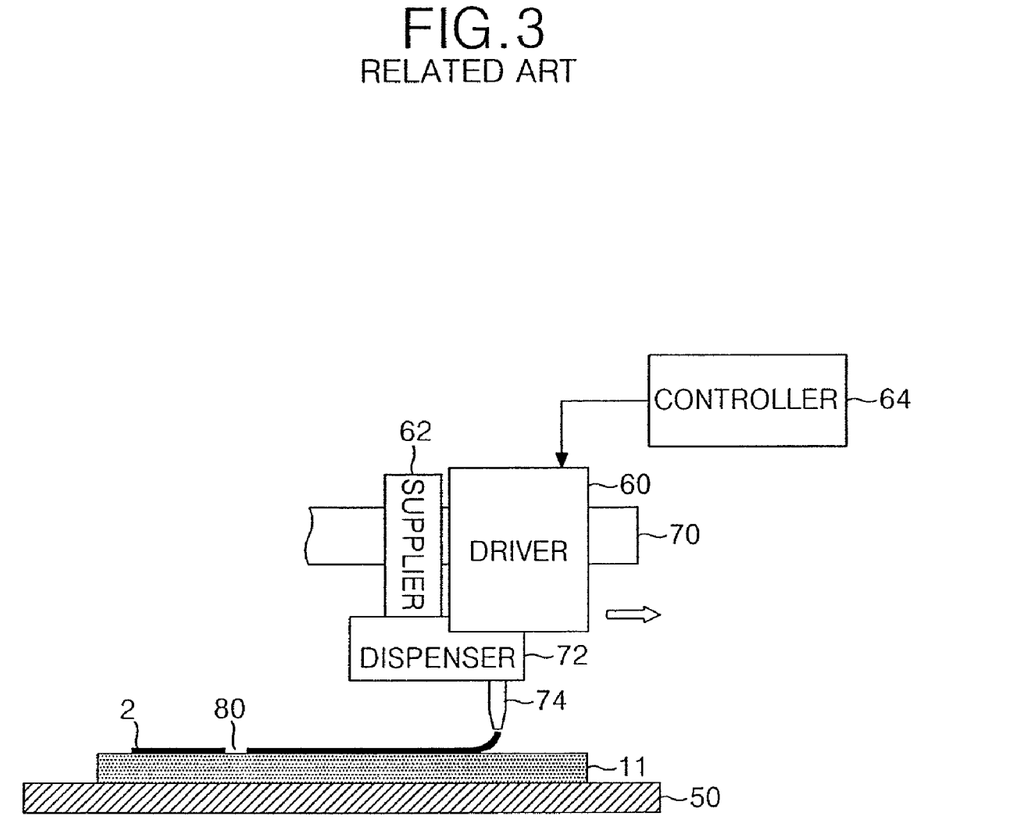
FIG. 3 is a block diagram showing a related art sealing apparatus.

As set forth above, the sealant 2, for combining the upper plate and the lower plate in the related art LCD device, formed on the upper plate, is formed by a sealing apparatus as shown in FIG. 3.

The sealing apparatus includes: a driver 60 facing the upper substrate 11 and executing horizontal movement and vertical movement; a guide line 70 for guiding the horizontal movement of the driver 60; a dispenser 72, installed at a lower end of the driver 60, for applying the sealant on the upper substrate 11; a supplier 62 connected to the dispenser 72 to supply the sealant; and a controller 64 for controlling the horizontal movement and the vertical movement of the driver 60.

The upper substrate 11 is reached by a loading device (not shown) on a stage 50. As described above, the black matrix 20, the color filter, and the common electrode of the picture display section 4 are formed on the upper substrate 11.

The driver 60 executes the horizontal movement along the guide line 70, in response to a control signal generated from the controller 64, or executes the vertical movement to correspond to the upper substrate 11.

The dispenser 72 applies the sealant 2 supplied from the supplier 62 to the upper substrate 11. To this end, a jet nozzle 74 is installed at one side of the dispenser 72 in order to supply the sealant 2 supplied from the dispenser 72 to the outer line of the picture display section 4 in a defined thickness and a defined width.

According to the related art sealing apparatus, when the upper substrate 11 is loaded on the stage 50, the driver 60 is lowered so as to have a designated gap between the jet nozzle 74 and the upper substrate 11 under a control of the controller 64. And then, the driver 60 executes the horizontal movement along the guide line 70. At this time, when the dispenser 72 is lowered so as to have the designated gap spaced from the upper substrate 11, the dispenser 72 supplies the sealant 2 from the supplier 62 to the net nozzle 74 in a designated pressure. Accordingly, as the driver 60 executes the horizontal movement, the jet nozzle 74 applies the sealant 2 supplied from the dispenser 72 in the designate pressure to the outer line of the picture display section 4 in the upper substrate 11 so as to have the designated thickness and the designated width.

However, in the related art sealing apparatus, when sealant 2 is applied, a broken line 80 occurs in the sealant 2 as shown in FIG. 3, due to the gap between the jet nozzle 74 and the upper substrate 11, a horizontal movement speed of the driver, the pressure exerted on the sealant 2 supplied from the dispenser 72 to the jet nozzle 74, and/or sudden clogging of the jet nozzle 74. Since the broken line 80 of the sealant 2 is inspected with the naked eye of a worker, the broken line 80 cannot be accurately detected. Meanwhile, if the broken line 80 of the sealant 2 is detected through the visible eyes of the worker, then the sealant 2 is applied again to the entire upper substrate 11. Thus, the related art sealing apparatus has a problem that a production yield is deteriorated because working hours of a sealing process become increased.

BRIEF SUMMARY

An apparatus and a method of fabricating a flat panel display device capable of detecting a broken line of a sealant in real time and of automatically repairing the detected broken line of the sealant is provided.

By way of introduction only, an apparatus of fabricating a display device according to an embodiment includes: a substrate; a stage on which the substrate is loaded; a dispenser from which a sealant is applied to the substrate; a light detector that emits light toward the substrate and detects an amount of light reflected toward the detector in real-time; and a controller that detects a position on the substrate that is to be covered with sealant but does not have the sealant, in accordance with a signal supplied from the light detector, and controls the dispenser so as to apply the sealant to the substrate at the position.

In another embodiment, a method of fabricating a display device includes applying a sealant at a picture display section formed on a substrate; detecting a broken line in the sealant applied to the substrate in real-time; and applying the sealant to a portion of the broken line missing sealant.

In another embodiment, an apparatus comprises a stage of sufficient size to receive a substrate of a display device; a dispenser from which a sealant is dispensed toward the stage; a source that emits energy at an oblique angle toward the stage; a detector that detects the energy from the source that has been reflected toward the detector; and a controller that controls the dispenser such that the dispenser traces a path while dispensing, detects a missing position along the path that does not contain the sealant in accordance with a signal supplied from the light detector, and controls the dispenser such that the dispenser moves back to the missing position and applies the sealant to the missing position.

BRIEF DESCRIPTION OF THE DRAWINGS

The following detailed description of the embodiments reference the accompanying drawings, in which.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawing.

Hereinafter, the preferred embodiments of the present invention will be described in detail with reference to FIGS. 4 to 7B.

Figure 4:
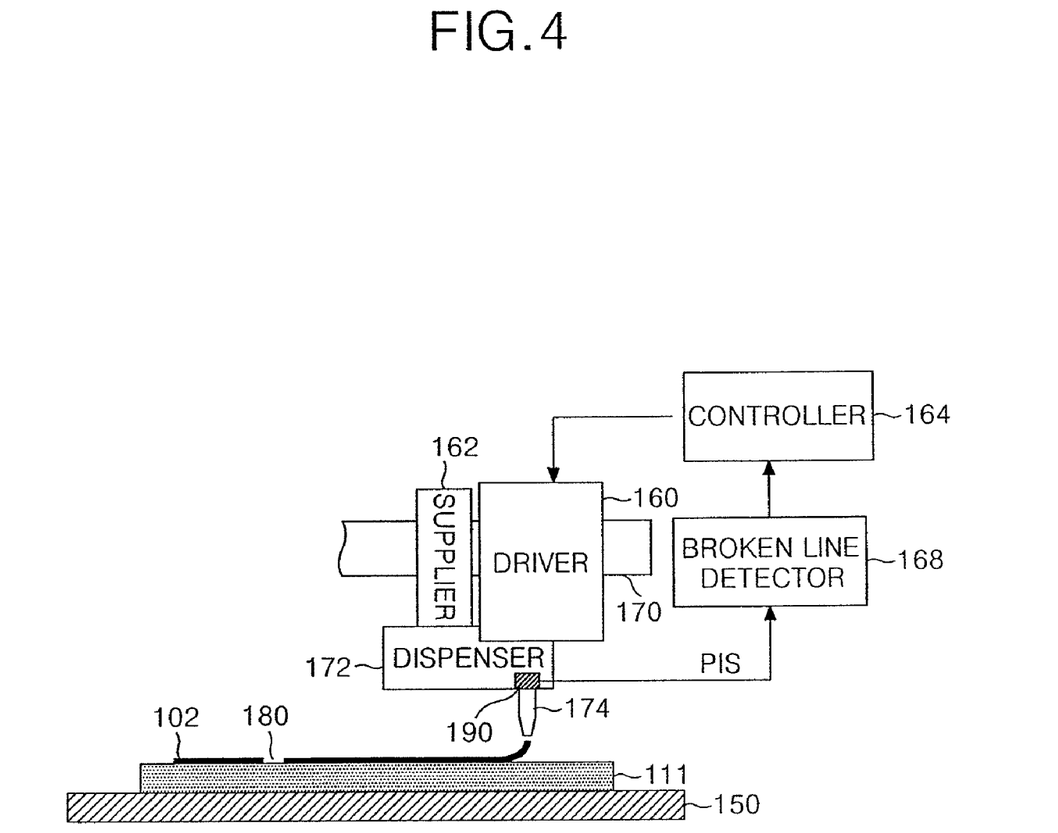
FIG. 4 is a front view illustrating an apparatus of fabricating a flat panel display device according to an embodiment of the present invention.

Referring to FIG. 4, a sealing apparatus of a flat panel display device according to an embodiment of the present invention includes: a stage 150 on which a substrate 111 having a picture display section is mounted; a driver 160 facing the substrate 111 and executing horizontal movement and vertical movement; a guide line 170 for guiding the horizontal movement of the driver 160; a supplier 162 for supplying a sealant 102 being applied to an outer line of the picture display section in the substrate 111; a dispenser 172, installed at a lower end of the driver 160, for applying the sealant supplied from the supplier 162 to the outer line of the picture display section in the substrate 111, through a jet nozzle 174; a light sensor 190 installed at a lower end of the dispenser 172 with the jet nozzle 174 therebetween; a broken line detector 168 for detecting an electrical signal from the light sensor 190; and a controller 164 for controlling the horizontal movement and the vertical movement of the driver 160 and controlling the driver 160 in accordance with a detected signal from the broken line detector 168.

The picture display section of the flat panel display device such as a liquid crystal display device, a field emission display device, a plasma display panel, an electro-luminescence display device and the like, is formed on the substrate 111. Such a flat panel display device includes a flat panel in which cells are arranged in a matrix between two glass substrates combined by the sealant 102, a printed circuit board module for driving the flat panel, and a case for protecting the flat panel and the printed circuit board module and integrating them. Accordingly, the substrate 111 may be either the upper substrate or the lower substrate.

The substrate 111 is loaded by a loading device (not shown) on the stage 150.

The driver 160 executes the horizontal movement along the guide line 170, in response to a control signal generated from the controller 164, or executes the vertical movement to correspond to the substrate 111.

The dispenser 172 applies the sealant 102 supplied from the supplier 162 to the jet nozzle 174 at a designated pressure. The jet nozzle 174 applies the sealant 102 supplied from the dispenser 172 at a designated pressure to the outer line of the picture display section by a designated thickness and a designated width. At this time, the jet nozzle 174 is spaced by a designated gap from the substrate 111 by the vertical movement of the driver 160.

Figure 5:
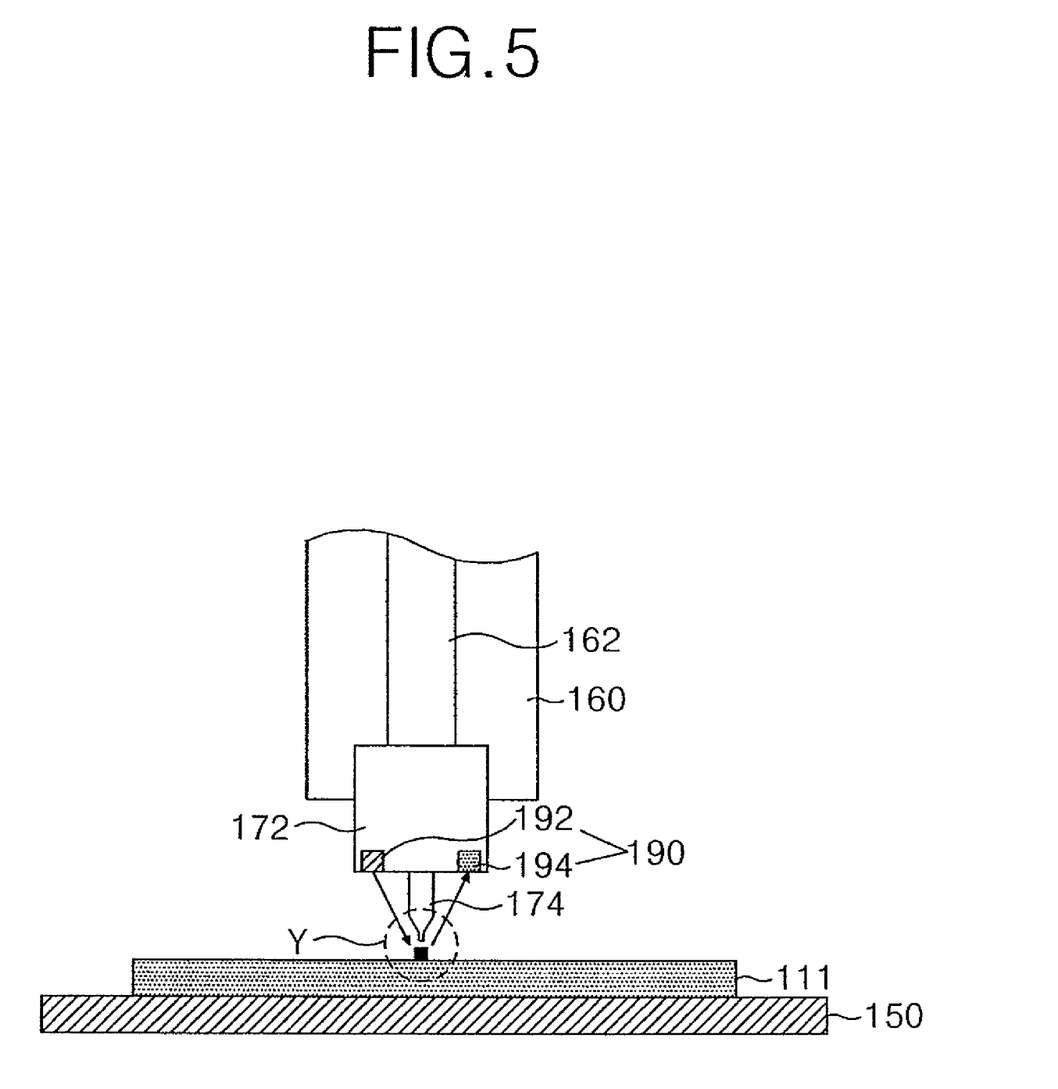
FIG. 5 is a side view illustrating an apparatus of fabricating the flat panel display device according to the embodiment of the present invention.

The light sensor 190, as shown in FIG. 5, includes: a light-emitter 192 installed at one side in a lower end of the dispenser 172 and separated by a designated distance from the jet nozzle 174; and a light-receiver 194 installed at an opposite side to the one side in a lower end of the dispenser 172 and separated by a designated distance from the jet nozzle 174.

The light-emitter 192, as shown in FIG. 5, irradiates light 196 from a light source (not shown) in a designated slant. In other words, the light-emitter 192 irradiates the light 196 from the light source toward the sealant 102 applied to the substrate 111 through the jet nozzle 174.

The light emitter 192 transmits the sealant and is reflected from the substrate 111. The light-receiver 194 receives the reflected light 198 to convert the received light 198 into an electrical signal.

Figure 6:
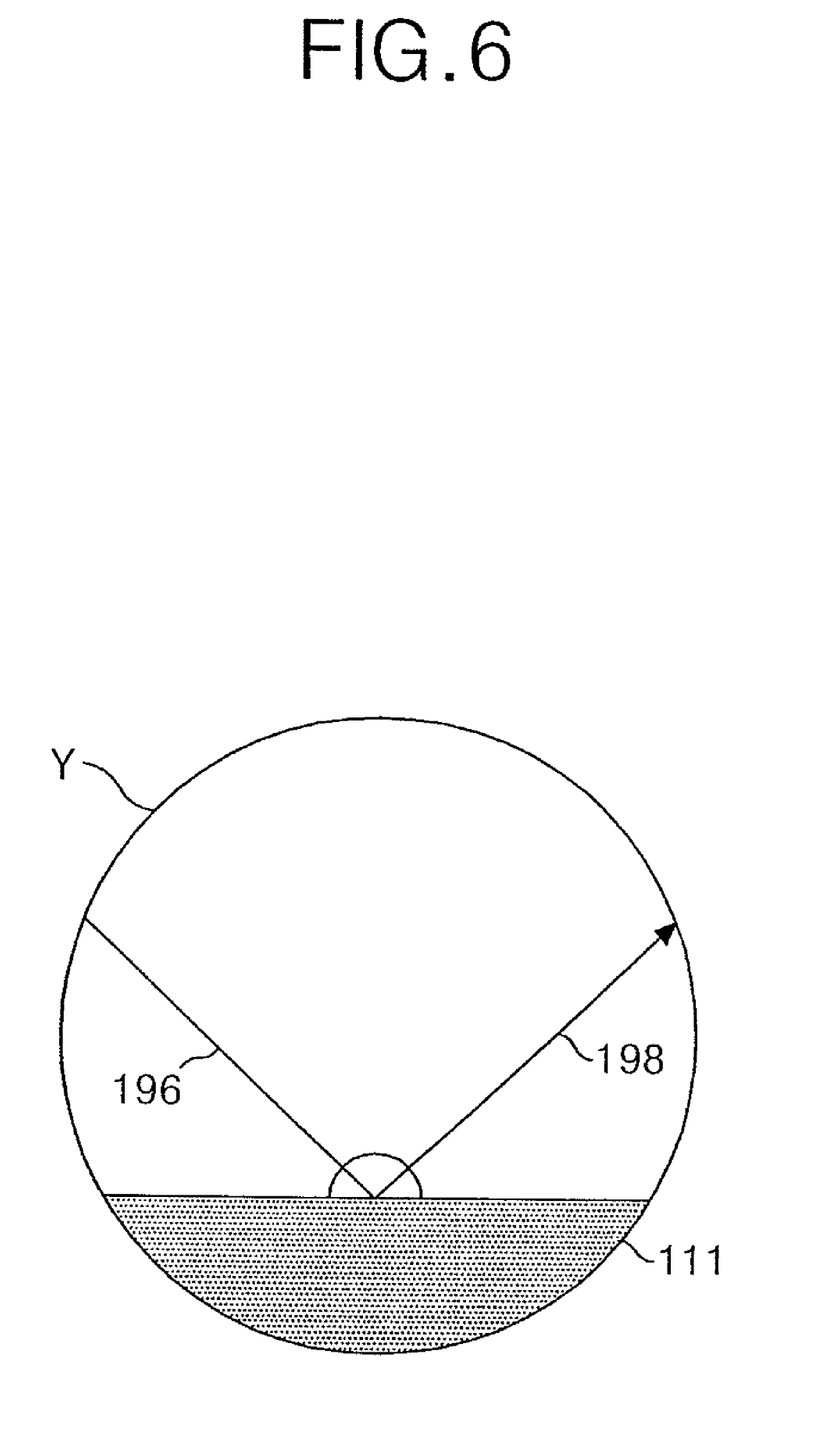
FIG. 6 is an enlarged view of an area Y shown in FIG. 5.

The broken line detector 168 receives the electrical signal from the light-receiver 194 of the light sensor 190 and detects the amount of the reflected light 198 from the substrate 111 that is incident on the light-receiver 194. Accordingly, the broken line detector 168 detects a broken line 180 of the sealant 102 applied to the substrate 111 using the electrical signal from the light-receiver 194.

In other words, the amount of the light 196 emitted from the light-emitter 192, transmitted through the sealant 102 normally applied through the jet nozzle 174 and then impinges on the light-receiver 194 is different from the amount of the light 198 emitted from the light-emitter 192, reflected from the substrate 111 exposed by the broken line 180 and then impinges on the light-receiver 194. As a result, the broken line detector 168 determines a location in which the electrical signal supplied from the light sensor 190 is increased upon applying the sealant 102 (i.e., a location having an increased amount of the light 196 transmitting through the sealant) as a broken line 180 in the sealant 102. And then, the broken line detector 168 generates a position information signal PIS corresponding to the broken line 180 to supply it to the controller 164.

The controller 164 controls the driver 160 to descend so as to have a designated gap spaced between the jet nozzle 174 and the upper substrate 111 when the substrate 111 is loaded on the stage 150. Also, the controller 164 controls the driver 160 to execute the horizontal movement along the guide line 170 at a designated speed. When the sealant 102 is completely applied on the substrate, the controller 164 controls the driver 160 so as to partially repair the broken line 180 in the sealant 102 in accordance with the position information signal PIS informing the existence the broken line 180 in the sealant 102 supplied from the broken line detector 168 when the sealant 102 have been applied. The broken line detector 160 may be incorporated in the controller 164 as a monolithic circuit.

Figure 7A:
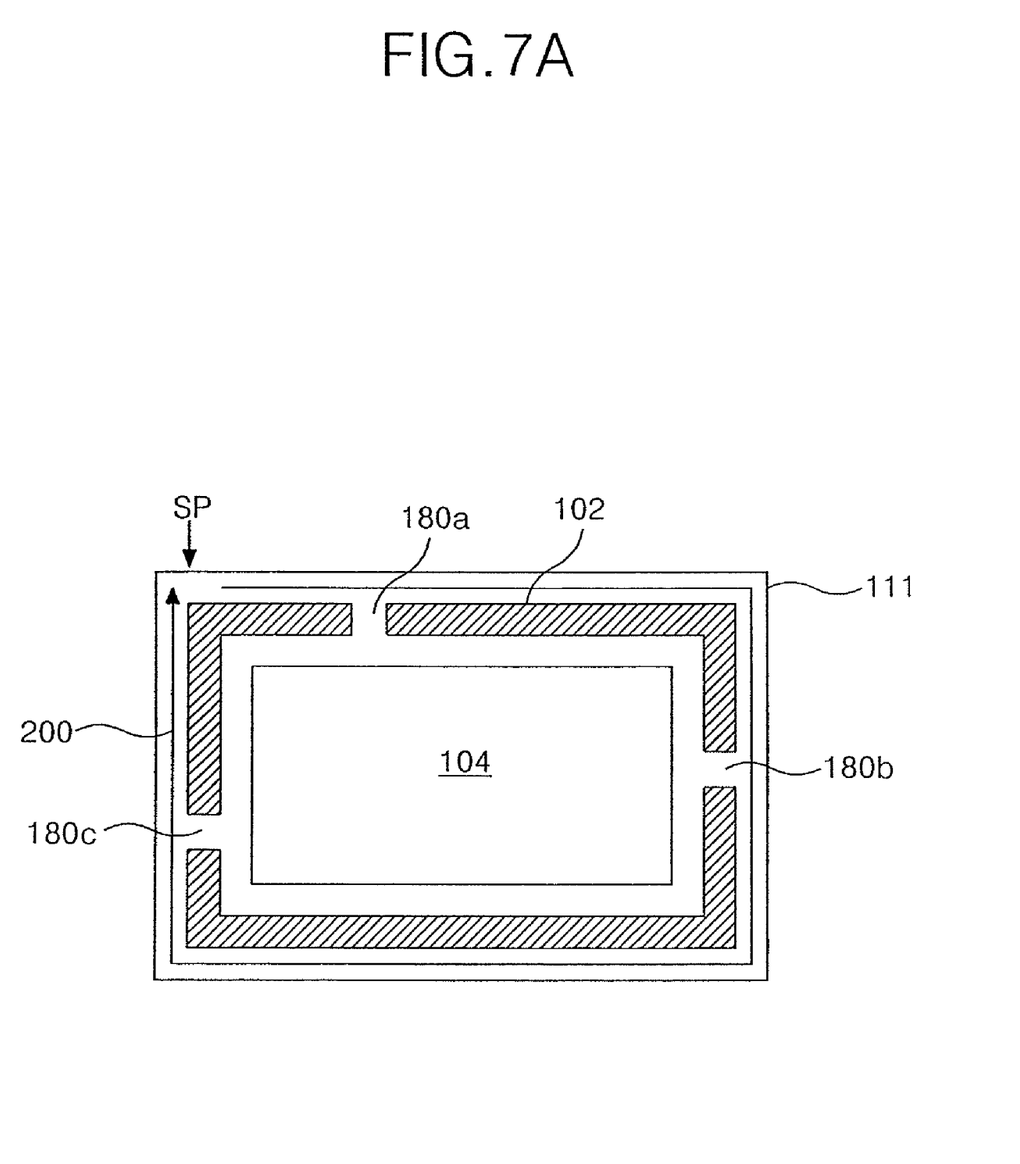
FIG. 7A is a configuration representing a real-time detection of a broken line in a sealant applied on a substrate by an apparatus and a method of fabricating the flat panel display device according to the embodiment of the present invention.

According to the apparatus and the method of fabricating the flat panel display panel of the embodiment of the present invention, when the substrate 111 is loaded on the stage 150 as shown in FIG. 7A, the driver 160 is lowered so as to have a designated gap spaced between the jet nozzle 174 and the substrate 111 under a control of the controller 164. And then, the driver 160 executes the horizontal movement along the guide line 170. At this time, when the dispenser 172 descends so as to be spaced from the substrate 111 by the designated gap, the dispenser 172 supplies the sealant 102 from the supplier 162 to the jet nozzle 174 at a designated pressure. Accordingly, as the driver 160 executes the horizontal movement, the jet nozzle 174 applies the sealant 102 supplied from the dispenser 172 at the designated pressure to the outer line of the picture display section 104 in the substrate 111 in order for the sealant 102 to have the designated thickness and the designated width. At this time, the controller 164 controls the driver 160 to make a path 200 of the jet nozzle 174 to be transferred along the outer line of the picture display section 104 from a left upper corner SP of the substrate 111.

When the sealant 102 is applied, the light sensor 190 emits light toward the sealant 102 applied to the substrate 111 and detects the amount of light transmitted from the sealant 102 to supply the electrical signal representing the detected amount of light to the broken line detector 168. Accordingly, the broken line detector 168 detects the broken line in the sealant 102 on a basis of the electrical signal supplied from the light sensor 190 in real-time, and generates the position information signals PISs, e.g., for broken lines 180a, 180b and 180c of the sealant 102 in real-time to supply them to the controller 164. At this time, the broken lines 180a, 180b and 180c in the sealant 102 generated upon applying the sealant 102 occurs due to the gap between the jet nozzle 174 and the substrate 111, a horizontal movement speed of the driver 160, the pressure exerted on the sealant 102 supplied from the dispenser 172 to the jet nozzle 174, and sudden clogging of the jet nozzle 174.

Figure 7B:
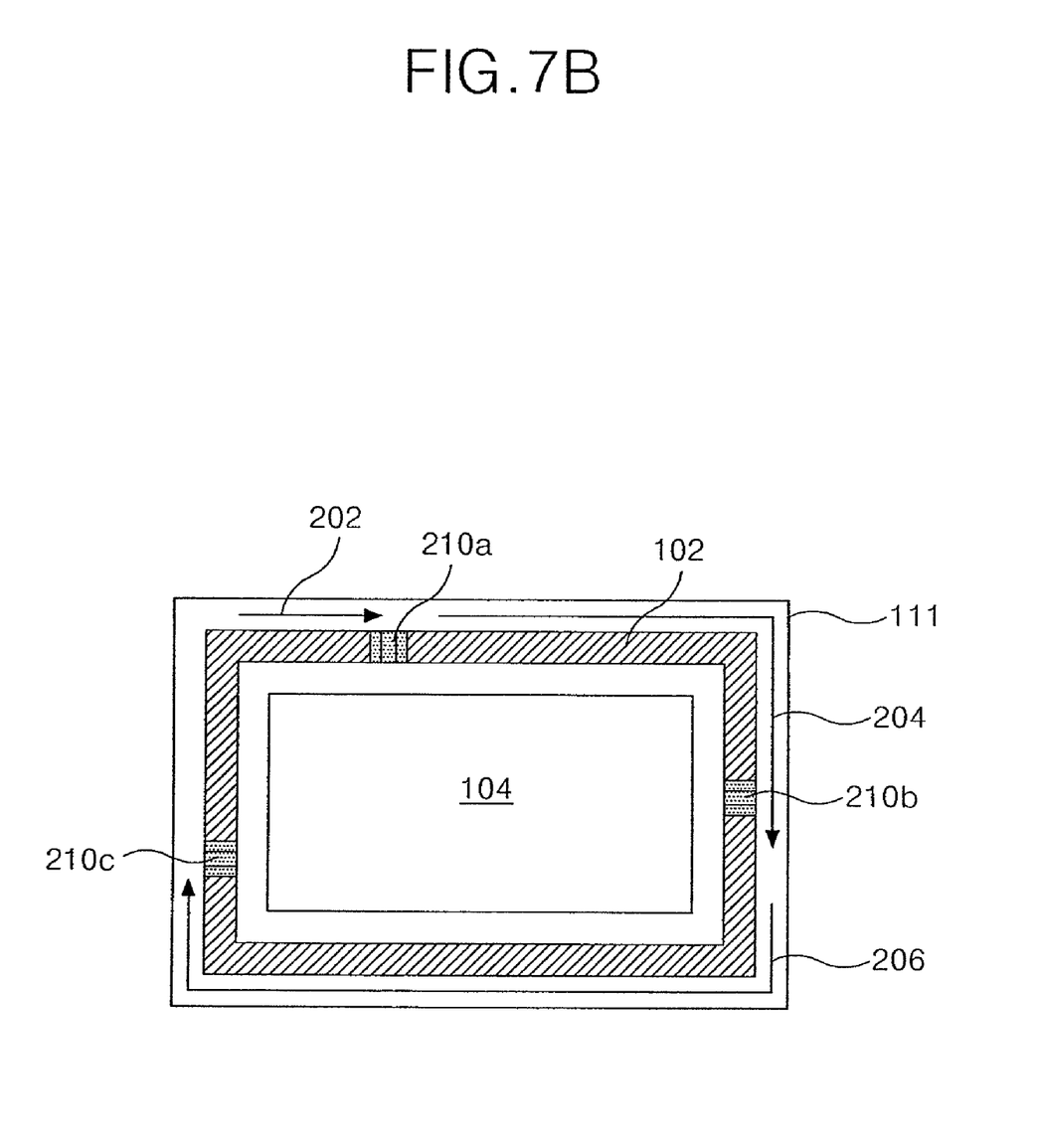
FIG. 7B is a configuration representing that the sealant is applied again to a broken line detected upon applying a first sealant as shown in FIG. 7A.

Meanwhile, when applying of a first sealant 102 is completed, the controller 164 controls the driver 160 in accordance with the position information signals PISs, supplied from the broken line detector 168 in real-time, for the broken lines 180a, 180b and 180c in the sealant 102. Accordingly, under the control of the controller 164, the driver 160 repositions the jet nozzle 174 to a location on the substrate 111 corresponding to the position information signals PISs for the broken lines 180a, 180b and 180c in the sealant 102 along transfer paths 202, 204 and 206 so that sealants 210a, 210b and 210c are additionally applied in the broken lines 180a, 180b and 180c in the sealant 102, respectively. As a result, the broken lines 180a, 180b and 180c in the sealant 102 are repaired.

On the other hand, if no position information signals PISs supplied from the broken line detector 168 for the broken lines 180a, 180b and 180c in the sealant 102 generated upon applying the sealant 102, the controller 164 controls the driver 160 so as to apply the sealant 102 to another substrate without initiating a repairing process of the sealant to the first substrate.

As described above, according to the apparatus and the method of fabricating the flat panel display device of the present invention, light is emitted toward the sealant applied to the substrate upon applying the sealant, and the amount of light transmitted through the sealant is detected in real-time to produce the position information signals for the broken lines in the sealant applied to the substrate. Thereafter, the broken lines in the sealant corresponding to the produced position information signals for the broken lines in the sealant are partially repaired after applying the sealant. As a result, it is possible to save working hours required for applying the sealant. Accordingly, the broken lines are detected through the light sensor in real-time to eliminate later inspection of the broken line in the sealant. As a result, it is possible to reduce fabrication time of the flat panel display device and thus to improve production yield.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

The invention claimed is:

1. A method of fabricating a display device, the method comprising:

loading a rectangular substrate on a stage;

applying a sealant on the rectangular substrate by moving a single dispenser along only an outline of the rectangular substrate;

emitting light toward the rectangular substrate using the single dispenser;

detecting the light reflected from the rectangular substrate using a light detector;

detecting a first position on which the sealant is applied and a second portion on which the sealant is unapplied in accordance with a signal supplied from the light detector, and generating a control signal based on the signal supplied from the light detector; and moving the single dispenser back to the second portion along a trace of the sealant on the rectangular substrate while the rectangular substrate is fixed on the stage, and reapplying the sealant to the portion using the sealant ejected from the single dispenser.

2. The method according to claim 1, wherein detecting the light comprises detecting an amount of the reflected light.

3. The method according to claim 1, further comprising applying the sealant to another rectangular substrate if no broken line is present.

4. The method according to claim 1, further comprising applying the sealant to the portion only after completing a predetermined pattern containing the broken line.

* * * * *